(12) United States Patent
Kassai et al.

(10) Patent No.: US 7,118,173 B2
(45) Date of Patent: Oct. 10, 2006

(54) BABY-CARE IMPLEMENT PROVIDED WITH HOOD

(75) Inventors: Kenzou Kassai, Osaka (JP); Ichiro Ohnishi, Nara (JP); Toshio Oonuma, Osaka (JP); Masaki Ito, Kitakatsuragi-gun (JP)

(73) Assignee: Aprica Ikujikenkyukai Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 11/116,107

(22) Filed: Apr. 26, 2005

(65) Prior Publication Data
US 2005/0258673 A1 Nov. 24, 2005

(30) Foreign Application Priority Data
May 21, 2004 (JP) .............................. 2004-152319

(51) Int. Cl.
A47C 29/00 (2006.01)
A47C 7/66 (2006.01)
(52) U.S. Cl. ........................... 297/184.13; 297/184.15; 297/184.17; 135/133
(58) Field of Classification Search ............. 297/184.1, 297/184.13, 184.15, 184.17; 135/132, 133, 135/136
See application file for complete search history.

(56) References Cited

U.S. PATENT DOCUMENTS 1,033,108 A * 7/1912 Lehmann ..................... 297/23
1,412,935 A * 4/1922 Greenebaum ................... 5/416
5,730,490 A * 3/1998 Mortenson ............. 297/184.13
6,019,421 A * 2/2000 Roh ....................... 297/184.13
6,217,099 B1 4/2001 McKinney et al.
6,517,153 B1 2/2003 Brewer

FOREIGN PATENT DOCUMENTS

| | | |
|---|---|---|
| DE | 2 215 211 | 10/1973 |
| GB | 2 349 566 | 11/2000 |
| JP | 07-019948 | 5/1995 |
| JP | 2003-019962 | 1/2003 |

* cited by examiner

Primary Examiner—Peter M. Cuomo
Assistant Examiner—Joseph Edell
(74) Attorney, Agent, or Firm—W. F. Fasse; W. G. Fasse

(57) ABSTRACT

A baby-care implement comprises a hood which covers a top of a seat thereof. The hood comprises a mounting base fixed to a body of the baby-care implement, a first hood bone whose lower end is turnably connected to the mounting base, a second hood bone positioned on the inner side of the first hood bone, whose lower end is turnably connected to the mounting base, a third hood bone positioned on the inner side of the second hood bone, a first hood sheet mounted on the first hood bone and extending backward and forward, and a second hood sheet mounted on the second hood bone, overlapping the inner side of the first hood sheet and extending backward and forward. The second hood sheet comprises one end in the back-and-forth direction which is separated from the first hood sheet and the other end which is connected to the first hood sheet.

16 Claims, 5 Drawing Sheets

BABY-CARE IMPLEMENT PROVIDED WITH HOOD

BACKGROUND OF THE INVENTION

1. Field of the Invention

The present invention relates to a baby-care implement provided with a seat such as a baby carriage, a baby bed/chair, a baby bed, a baby chair and the like, and more particularly, to a baby-care implement provided with a hood which covers a top of a seat.

2. Description of the Background Art

Conventionally, it is known that a hood for protection from the sun is mounted on a seat of a baby-care implement such as a baby carriage. In many cases, a hood sheet is formed of an airtight cloth and the like entirely to shut out the sunlight or wind. Therefore, air in the seat stagnates, which gives a baby uncomfortable feeling in some cases. This is noticeable in a case of a domed hood which completely covers a top of the seat.

Japanese Unexamined Patent Publication No. 2003-19962 discloses a hood mechanism which can appropriately shut out the sunlight or wind and provide appropriate air circulation. The hood mechanism disclosed in the above document comprises a plurality of frames turnably provided at a base, and hood sheets provided between the frames. The hood sheet between the adjacent desired frames is formed of a mesh material and both ends of the mesh material is detachable. According to this hood mechanism, the air circulation can be provided in the seat to some extent by exposing the hood sheet formed of the mesh material according to need.

Japanese Utility Model Publication No. 7-19948 discloses a baby carriage provided with a windproof hood inside a hood. A hood sheet has a domed configuration which covers a top part and a rear part of a seat, and a front part of the seat is largely opened. The windproof hood is formed of a transparent synthetic resin film and the like so as not to prevent a field of view of a baby and it is turnably provided inside the hood sheet. According to this hood mechanism, when air circulation is needed, the windproof hood is brought to a rear position so as to overlap the hood sheet. Meanwhile, when it is necessary to prevent wind from entering the seat, the windproof hood is brought to a front position of the seat in which the hood sheet is not provided.

The Japanese Unexamined Patent Publication No. 2003-19962 discloses the hood which can provide the air circulation in addition to an original sunshade function. In addition, the Japanese Utility Model Publication No. 7-19948 discloses the hood which can provide a high windproof effect in addition to an original sunshade function.

The inventors of the present invention consider that the above hood function is not enough to provide comfortable circumstances for a baby in the seat. Thus, the inventors considered a hood of the child-care implement which can have the following functions.

(1) Ultraviolet ray blocking effect
(2) Noise blocking effect
(3) Cold protecting effect
(4) Wind-proof effect
(5) Dust-proof effect
(6) Air permeability
(7) Preferable field of view from a mother
(8) Preferable field of view from a baby
(9) Brightness adjustment in a seat

SUMMARY OF THE INVENTION

It is an object of the present invention to provide a baby-care implement provided with a hood which can provide the above multiple functions.

A baby-care implement according to the present invention comprises a hood which covers a top of a seat thereof. The hood comprises a mounting base fixed to a body of the baby-care implement, a first hood bone whose lower end is turnably connected to the mounting base, a second hood bone positioned on the inner side of the first hood bone, whose lower end is turnably connected to the mounting base, a first hood sheet mounted on the first hood bone and extending backward and forward, and a second hood sheet mounted on the second hood bone, overlapping the inner side of the first hood sheet and extending backward and forward. The second hood sheet comprises one end in the back-and-forth direction which is separated from the first hood sheet and the other end which is connected to the first hood sheet.

According to the baby-care implement having the above constitution, since the first hood sheet and the second hood sheet can be provided so as to overlap each other, an appropriate size and configuration of the second hood sheet positioned inside can be exposed by appropriately adjusting an area of the first hood sheet positioned outside.

Preferably, the baby-care implement further comprises a third hood bone on the inner side of the second hood bone. In this case, the second hood sheet comprises a region positioned between the second hood bone and the third hood bone, and a region extending beyond the third hood bone. In addition, the first hood sheet comprises a region positioned between the first hood bone and the second hood bone, a region positioned between the second hood bone and the third hood bone, and a region extending beyond the third hood bone. In this constitution, since the first hood sheet and the second hood sheet cover a large part of the top of the seat, more comfortable circumstances can be provided for the baby.

According to one embodiment, the third hood bone is formed by a part of a body frame of the baby-care implement. More specifically, the third hood bone is a U-shaped frame which supports a backrest part of the seat.

Preferably, the first hood sheet is formed of a material which is superior in light blocking property as compared with the second hood sheet. Meanwhile, the second hood sheet is formed of a material which is superior in air permeability as compared with the first hood sheet. In this constitution, an excellent ultraviolet ray blocking effect can be provided by largely opening the first hood sheet positioned outside to increase a covering area of the first hood sheet. Meanwhile, excellent air circulation can be provided by folding the first hood sheet positioned outside in an appropriate direction to reduce the covering area by the first hood sheet and increase an exposed area of the second hood sheet.

For example, the first hood sheet is formed of a thick cloth, and the second hood sheet is formed of a mesh material. When the ultraviolet ray blocking effect, the noise blocking effect, the cold protecting effect, the windproof effect and the dust-proof effect are needed, the first hood sheet on the outside is largely opened to increase the covering area by the first hood sheet. Meanwhile, when the covering area by the first hood sheet is reduced and the exposed area of the second hood sheet is increased by appropriately folding the first hood sheet on the outside in the appropriate direction, there can be provided a preferable field of view for the mother or the baby.

When the second hood sheet has a coarse texture, it can provide a light blocking effect to some extent, while still providing the air circulation. Since a visual function has not developed enough for a baby shortly after birth, it is thought that an environment which is too bright is not preferable for that baby. For example, when the baby is taken out in the baby carriage on a fine day, the brightness can be reduced while the preferable air circulation can be provided by folding the first hood sheet to reduce its covering area and covering an entire seat with the second hood sheet.

According to a preferable embodiment, the first hood sheet can be separated backward and forward at a separation line extending an entire length of its width in a middle position in the back-and-forth direction, and the separated parts can be folded forward and backward, respectively. For example, a slide fastener is provided at the separation line. In this constitution, the second hood sheet can be partially exposed, which is very convenient.

DESCRIPTION OF THE PREFERRED EMBODIMENTS

As a baby-care implement to which the present invention is applied, although there is a baby carriage, a baby bed/chair, a baby bed, a baby chair or the like, the baby carriage will be described as an illustration hereinafter.

Figure 1:
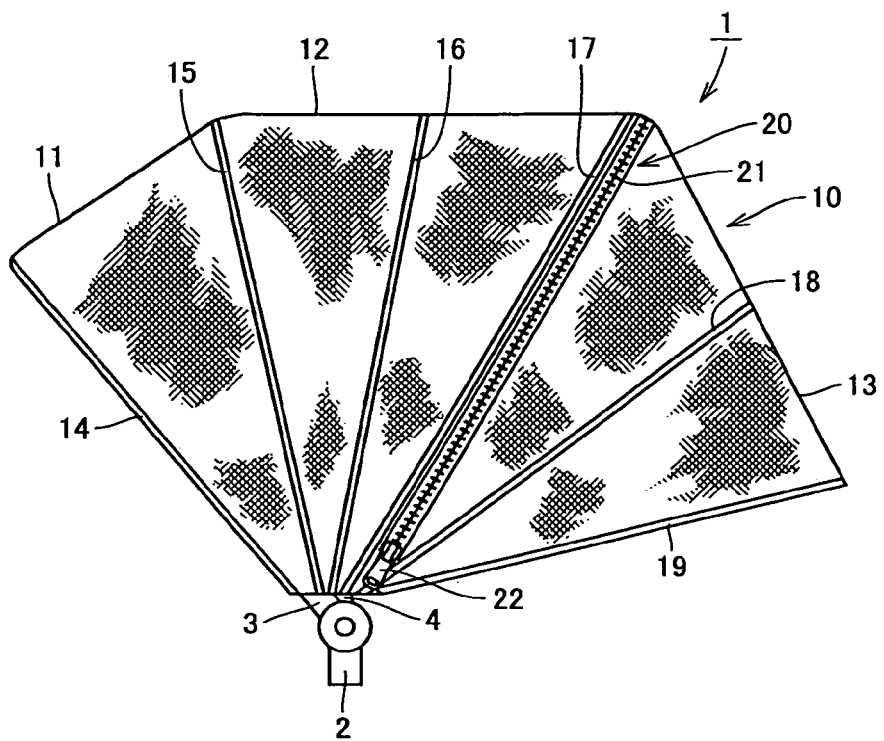
FIG. 1 is a side view showing one embodiment of the present invention.
Figure 2:
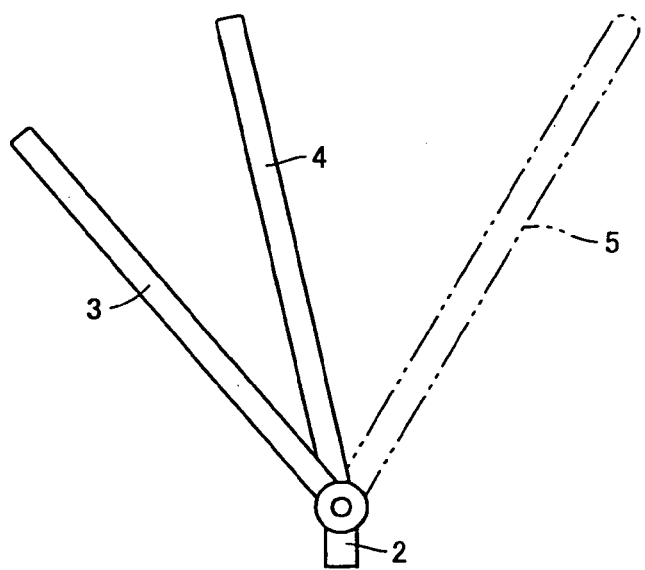
FIG. 2 is a view showing hood bones.
Figure 3:
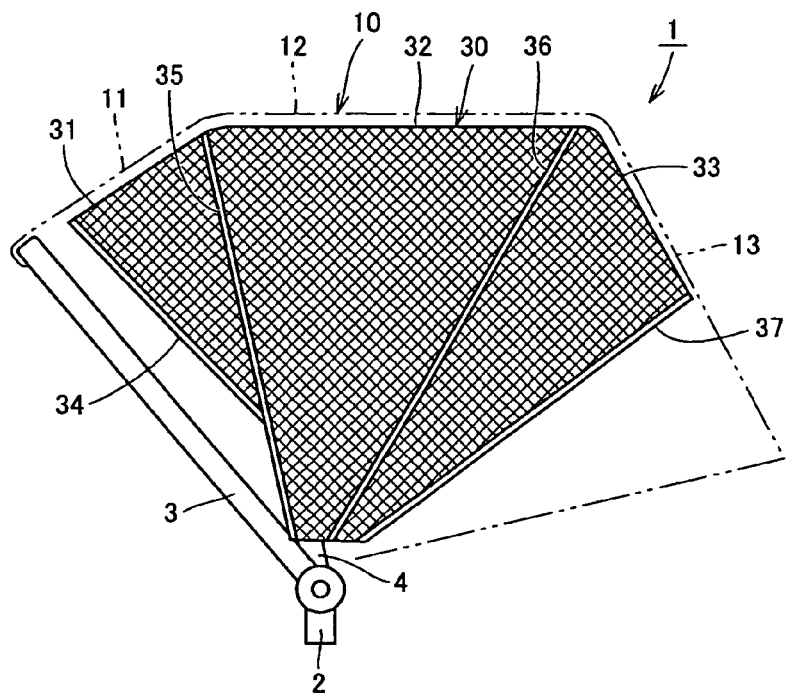
FIG. 3 is a side view showing a whole configuration of a second hood sheet positioned inside.
Figure 4:
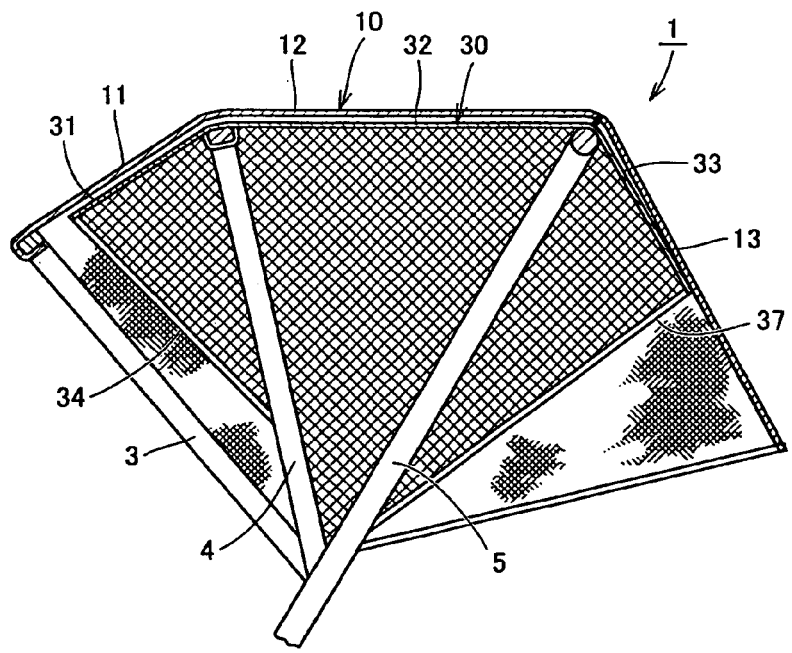
FIG. 4 is a sectional view showing one embodiment of the present invention.

FIGS. 1, 3 and 4 show a hood to be mounted on a body of a baby carriage, and FIG. 2 shows hood bones. In addition, FIGS. 5 to 10 show various kinds of used configurations of the hood. First, a whole structure of the hood of the baby carriage will be described with reference to FIGS. 1 to 4.

An illustrated hood 1 covers a top of a seat of the baby carriage and has a domed shape. The hood 1 comprises a pair of mounting bases fixed to a body of the baby carriage, a U-shaped first hood bone 3 whose lower ends are turnably connected to the pair of mounting bases 2, a U-shaped second hood bone 4 positioned on the inner side of the first hood bone 3, whose lower ends are turnably connected to the pair of mounting bases 2, and a U-shaped third hood bone 5 positioned on the inner side of the second hood bone 4. According to an illustrated embodiment, the third hood bone 5 is not connected to the pair of mounting bases 2 but it is formed by a part of a body frame of the baby carriage. More specifically, the third hood bone 5 is a U-shaped frame which supports a backrest part of the seat of the baby carriage. As another embodiment, the third hood bone 5 is not formed by the part of the body frame of the baby carriage but its lower ends may be fixed or turnably connected to the pair of mounting bases 2.

According to a state shown in FIG. 2, the first hood bone 3 and the second hood bone 4 are in the most forward positions within their moving ranges, respectively. The first hood bone 3 can pass through the second hood bone 4 and the third hood bone 5 and be turned to a further rear position. The second hood bone 4 can pass through the third hood bone 5 and be turned to a further rear position.

As can be clear from FIGS. 3 and 4, the hood 1 comprises a first hood sheet 10 mounted on the first hood bone 3 and extending backward and forward, and a second hood sheet 30 mounted on the second hood bone 4 and extending backward and forward. The second hood sheet 30 is positioned so as to overlap the inner side of the first hood sheet 10.

The second hood sheet 30 comprises a front region 31 positioned anterior to the second hood bone 4, a middle region 32 positioned between the second hood bone 4 and the third hood bone 5, and a rear region 33 positioned posterior to the third hood bone 5. The second hood sheet 30 is formed of a material such as mesh which is superior in air permeability as compared with the first hood sheet 10. As shown in FIG. 3, the second hood sheet 30 formed of the mesh has reinforcing bands 34, 35, 36 and 37 at its front end position, at a position along the second hood bone 4, at a position along the third hood bone 5 and at its rear end position, respectively.

The first hood sheet 10 is formed of a material such as a thick cloth which is superior in light blocking effect as compared with the second hood sheet 30 and comprises a front region 11 positioned between the first hood bone 3 and the second hood bone 4, a middle region 12 positioned between the second hood bone 4 and the third hood bone 5, and a rear region 13 positioned posterior to the third hood bone 5. As shown in FIG. 1, the first hood sheet 10 has reinforcing bands 14, 15, 16, 17, 18 and 19 at its front end position along the first hood bone 3, at a position along the second hood bone 4, at a central position in the middle region 12, at a position along the third hood bone 5, at a central position in the rear region 13 and at its rear end position, respectively.

Although the front end 34 of the second hood sheet 30 is separated from the first hood sheet 10, the rear end 19 of the second hood sheet 30 is connected to the center in the rear region 13 of the first hood sheet 10.

As shown in FIG. 4, one end of the first hood sheet 10 is connected to the first hood bone 3, and the other end of the first hood sheet 10 extends rearwardly beyond the second hood bone 4. Also in FIG. 4, one end of the second hood sheet 30 extends forwardly from the second hood bone 4 to a position between the first hood bone 3 and the second hood bone 4, and the other end of the second hood sheet 30 is connected to an inner surface of the first hood sheet 10 at a position rearwardly beyond the second hood bone 4.

As shown in FIG. 1, the first hood sheet 10 can be separated backward and forward at a separation line extending an entire length of the third hood bone 5 in the width direction, and the separated front and rear parts can be folded forward and backward, respectively. According to the illustrated embodiment, a slide fastener 20 is provided at the separation line. The slide fastener 20 comprises slide rails 21 which are opposed to be separated and a slider 22.

Various kinds of its used configurations will be described with reference to FIGS. 5 to 10.

Figure 5:
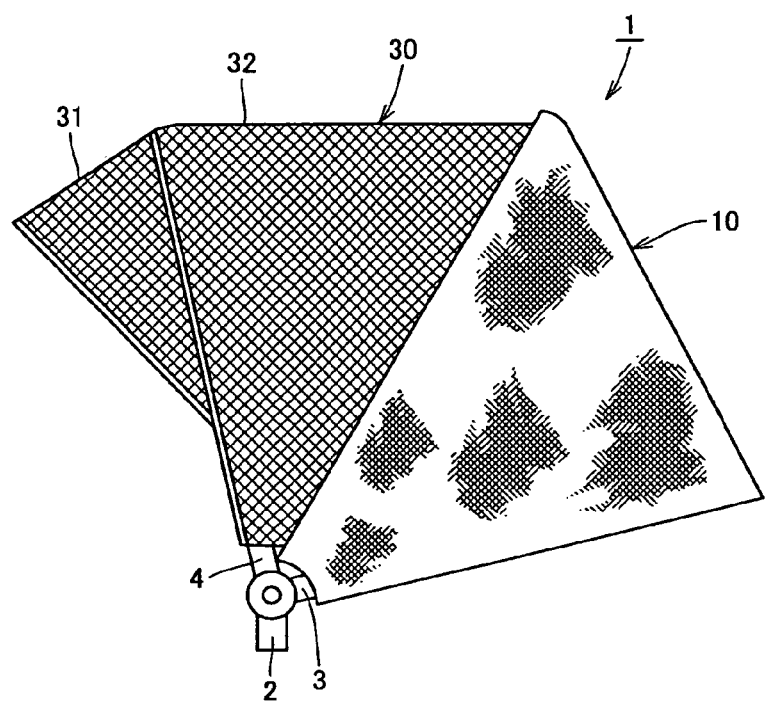
FIG. 5 is a view showing an example of a used configuration of a hood.

According to a state shown in FIG. 5, the first hood bone 3 is moved to the rear end of the hood 1, and the front region 11 and the middle region 12 of the first hood sheet 10 are folded so as to overlap the rear region 13. Therefore, the front region 31 and the middle region 32 in the second hood sheet 30 formed of the mesh material are exposed to the outside.

Figure 6:
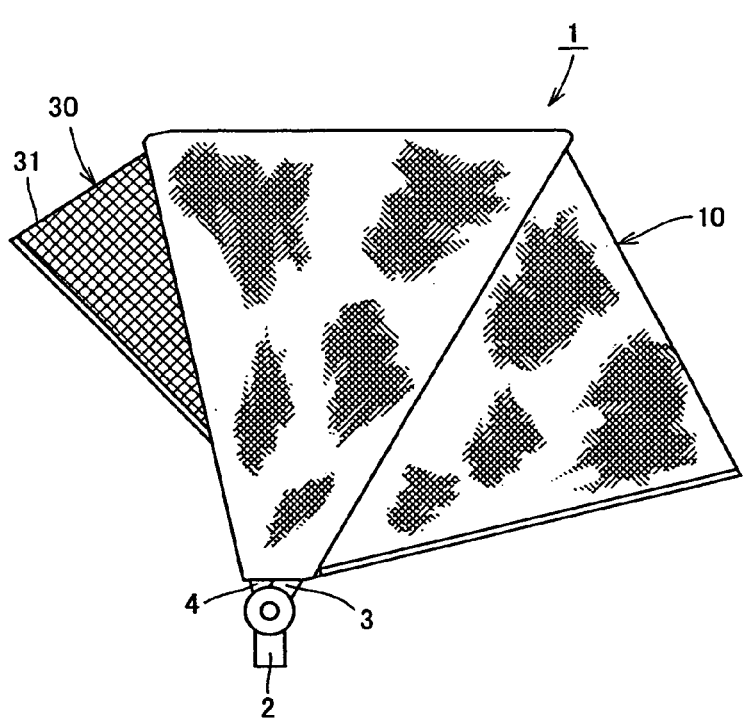
FIG. 6 is a view showing another example of the used configuration of the hood.

According to a state shown in FIG. 6, the first hood bone 3 is moved to the position so as to be in line with the third hood bone 5, and the front region 11 of the first hood sheet 10 is folded so as to overlap the middle region 12. Therefore, only the front region 31 in the second hood sheet 30 formed of the mesh material is exposed to the outside.

Figure 7:
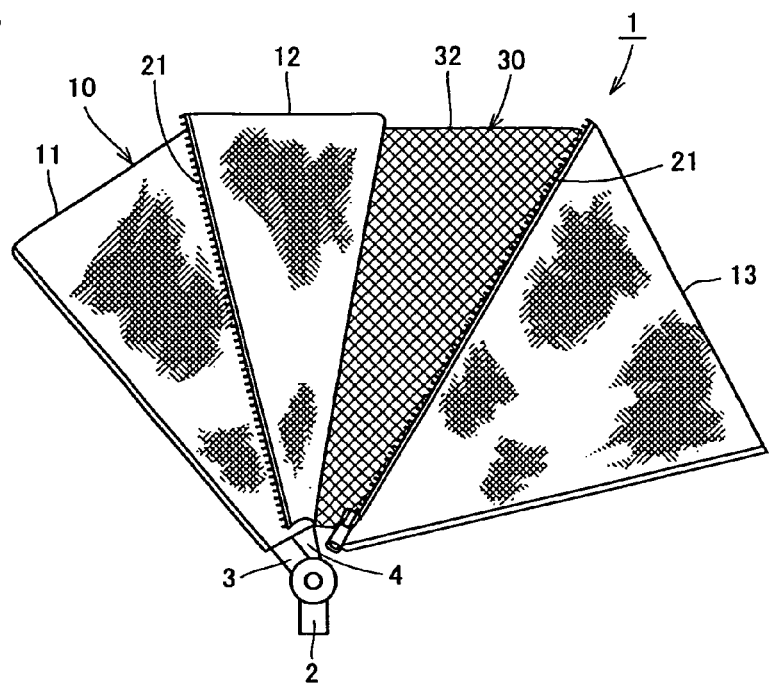
FIG. 7 is a view showing still another example of the used configuration of the hood.

According to a state shown in FIG. 7, the slide fastener 20 provided in the first hood sheet 10 is opened, and a rear part of the middle region 12 positioned anterior to the separation line is folded forward. Therefore, a part of the second hood sheet 30 positioned under the rear part of the middle region 12 of the first hood sheet 10 is exposed. Thus, a person who moves the baby carriage can observe a baby in the seat through the exposed part of the mesh second hood sheet.

Figure 8:
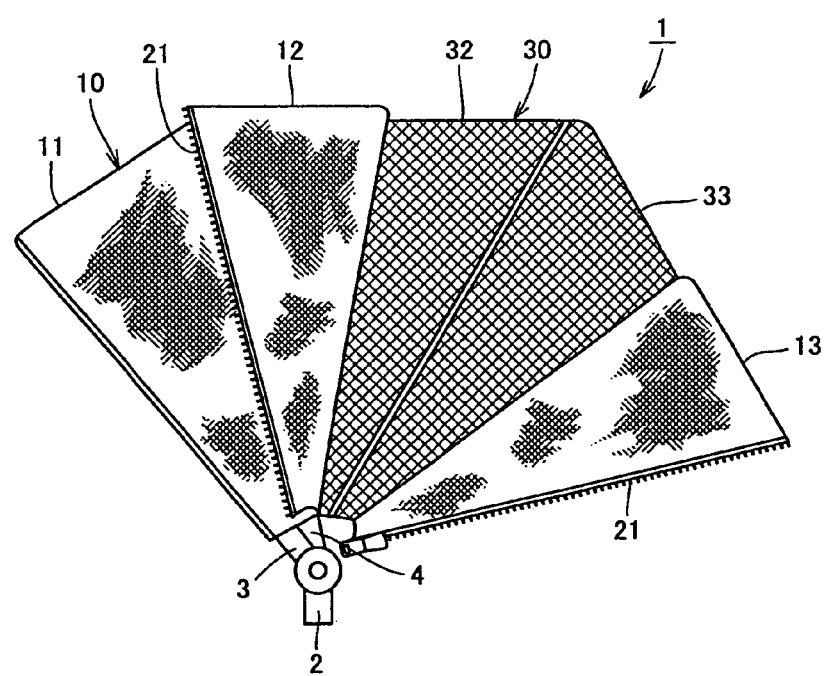
FIG. 8 is a view showing still another example of the used configuration of the hood.

According to a state shown in FIG. 8, the slide fastener 20 provided in the first hood sheet 10 is opened, the rear part of the middle region 12 positioned anterior to the separation line is folded forward, and a front part of the rear region 13 positioned posterior to the separation line is folded backward.

Figure 9:
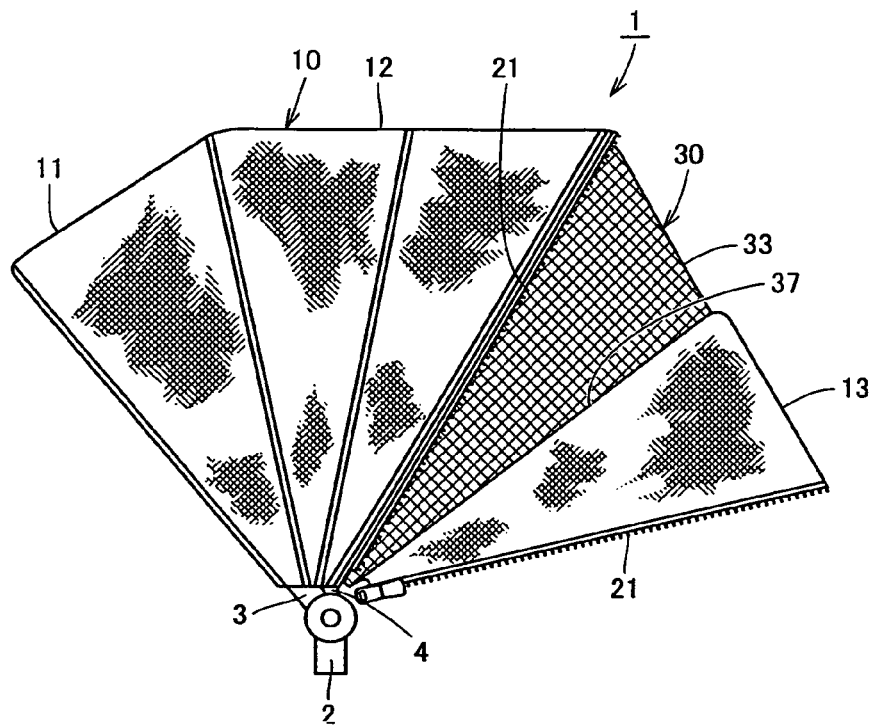
FIG. 9 is a view showing still another example of the used configuration of the hood.

According to a state shown in FIG. 9, the slide fastener 20 provided in the first hood sheet 10 is opened, and the front part of the rear region 13 positioned posterior to the separation line is folded backward.

Figure 10:
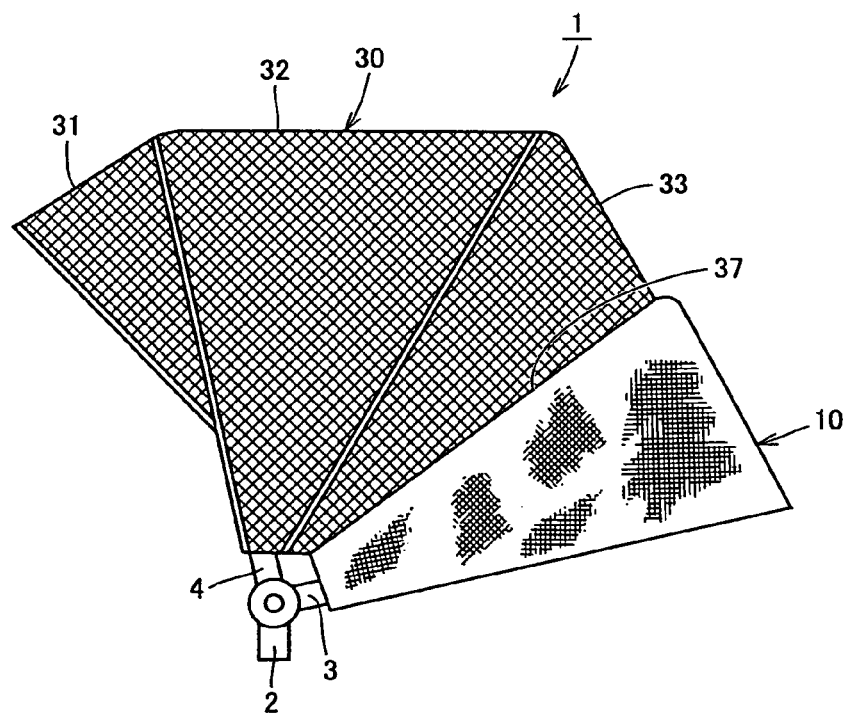
FIG. 10 is a view showing still another example of the used configuration of the hood.

According to a state shown in FIG. 10, the first hood bone 3 is moved to the backmost end of the hood 1 and the whole first hood sheet 10 is folded so as to overlap the rear part of the rear region 13. In this state, the whole second hood sheet 30 is exposed to the outside.

Since the first hood bone 3 and the second hood bone 4 are turnably connected to the pair of mounting bases 2, an opening angle of the entire hood can be appropriately adjusted or the hood can be entirely folded so as to become small although it is not shown.

As described above, the hood 1 can take various kinds of configurations according to need. For example, when an ultraviolet ray blocking effect, a noise blocking effect, a cold protecting effect, a dust-proof effect are needed, the configuration shown in FIG. 1 is taken. When it is necessary to absorb strong sunshine and provide enough air circulation, the configuration shown in FIG. 10 is taken. When a person such as a mother who operates the baby carriage wants to observe the baby in the seat, the configuration shown in FIG. 7, 8 or 9 is taken. In addition, when the configuration shown in FIG. 5 or 6 is taken, a wide field of view can be provided for the baby.

Although the baby carriage has been described as an example of the baby-care implement in the above, the present invention can be applied to the baby chair/bed, the baby bed, the baby chair and the like.

Although the embodiment of the present invention has been described with reference to the drawings, the present invention is not limited to the illustrated embodiment. Various modifications and alterations might be made in the illustrated embodiment without departing from the spirit and scope of the invention.

The present invention can be effectively applied to the baby-care implement provided with the hood.

What is claimed is:

1. A baby-care implement provided with a hood which covers a top of a seat thereof, wherein said hood comprises:
    a mounting base fixed to a body of the baby-care implement;
    a first hood bone whose lower end is turnably connected to said mounting base;
    a second hood bone positioned on an inner side of said first hood bone, whose lower end is turnably connected to said mounting base;
    a first hood sheet mounted on said first hood bone and extending backward and forward, wherein a first end of said first hood sheet is connected to said first hood bone, and a second end of said first hood sheet extends backward beyond said second hood bone; and
    a second hood sheet mounted on said second hood bone, overlapping an inner side of said first hood sheet and extending backward and forward, wherein a first end of said second hood sheet is separated from said first hood sheet and is positioned between said first hood bone and said second hood bone when said first hood bone is in a forward position thereof, and a second end of said second hood sheet is connected to said inner side of said first hood sheet at a position backward beyond said second hood bone.

2. The baby-care implement provided with the hood according to claim 1, further comprising a third hood bone on an inner side of the second hood bone, wherein
    said second hood sheet comprises a region positioned between said second hood bone and said third hood bone, and a region extending backward beyond said third hood bone, and
    said first hood sheet comprises a region positioned between said first hood bone and said second hood bone, a region positioned between said second hood bone and said third hood bone, and a region extending backward beyond said third hood bone.

3. The baby-care implement provided with the hood according to claim 2, wherein said third hood bone is formed by a part of a body frame of the baby-care implement.

4. The baby-care implement provided with the hood according to claim 3, wherein said third hood bone is a U-shaped frame which supports a backrest part of the seat.

5. The baby-care implement provided with the hood according to claim 1, wherein
    said first hood sheet is formed of a material which is superior in light blocking property as compared with said second hood sheet, and
    said second hood sheet is formed of a material which is superior in air permeability as compared with said first hood sheet.

6. The baby-care implement provided with the hood according to claim 1, wherein
    said first hood sheet is formed of a thick cloth, and
    said second hood sheet is formed of a mesh material.

7. The baby-care implement provided with the hood according to claim 1, wherein said first hood sheet can be separated backward and forward at a separation line extending entirely along a width of said first hood sheet in a middle position in a back-and-forth direction, and separated parts of said first hood sheet on opposite sides of said separation line can be folded forward and backward, respectively.

8. The baby-care implement provided with the hood according to claim 7, further comprising a slide fastener provided at said separation line.

9. A hood arrangement for a baby-care implement including a body with a seat, wherein said hood arrangement is adapted to selectively cover an area above said seat, and wherein said hood arrangement comprises:

a mounting base adapted to be fixed to said body;

a first hood bone of which a lower end is pivotably connected to said mounting base so that said first hood bone is selectively pivotable between forward and rearward positions thereof;

a second hood bone of which a lower end is pivotably connected to said mounting base so that said second hood bone is selectively pivotable between forward and rearward positions thereof;

a first hood sheet having a forward portion that is connected to said first hood bone and is separate from said second hood bone, and having a rearward portion that extends rearwardly beyond said forward position of said second hood bone; and a second hood sheet having a forward portion that is connected to said second hood bone and is separate from said first hood bone and said first hood sheet, and having a rearward portion of which a rearward terminal end is connected to said rearward portion of said first hood sheet.

10. The hood arrangement for the baby-care implement according to claim 9, wherein a forward terminal end of said forward portion of said first hood sheet is connected to said first hood bone, a forward terminal end of said forward portion of said second hood sheet is not connected to said second hood bone and protrudes forwardly from a part of said forward portion of said second hood sheet that is connected to said second hood bone, and said forward terminal end of said second hood sheet is positioned between said first and second hood bones respectively in said forward positions thereof.

11. The hood arrangement for the baby-care implement according to claim 9, wherein a rearward terminal end of said rearward portion of said first hood sheet protrudes rearwardly beyond said rearward terminal end of said second hood sheet.

12. The hood arrangement for the baby-care implement according to claim 9, wherein said second hood sheet is connected to said first hood sheet only at said rear terminal end of said second hood sheet.

13. The hood arrangement for the baby-care implement according to claim 9, wherein said first hood sheet is more opaque than said second hood sheet, and said second hood sheet is more air permeable than said first hood sheet.

14. The hood arrangement for the baby-care implement according to claim 13, wherein said first hood sheet comprises a cloth sheet, and said second hood sheet comprises a mesh sheet.

15. The hood arrangement for the baby-care implement according to claim 9, wherein said second hood sheet is arranged on a side of said first hood sheet closer toward said seat.

16. The hood arrangement for the baby-care implement according to claim 9, wherein said forward portion and said rearward portion of said first hood sheet are separably connected to one another along a separation line extending widthwise of said first hood sheet between said forward portion and said rearward portion of said first hood sheet so that said forward portion and said rearward portion of said first hood sheet can be selectively separated along said separation line, and wherein said forward portion and said rearward portion of said second hood sheet are inseparably connected to one another so as not to be separable from one another.

* * * * *